Figure 1A:
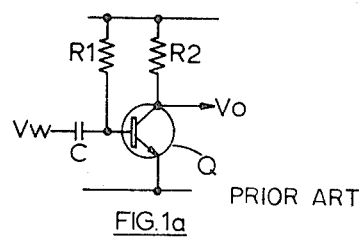

United States Patent [19]

Brearley et al.

[11] 4,223,957
[45] Sep. 23, 1980

[54] ANTI-LOCK BRAKE CONTROL SYSTEM I

[75] Inventors: Malcolm Brearley, Solihull; Alfred K. White, Birmingham, both of England

[73] Assignee: Girling Limited, Birmingham, England

[21] Appl. No.: 893,798

[22] Filed: Apr. 5, 1978

[30] Foreign Application Priority Data

Apr. 5, 1977 [GB] United Kingdom ............... 14240/77

[51] Int. Cl.³ .............................................. B60T 8/02
[52] U.S. Cl. .................................... 303/106; 303/110
[58] Field of Search ................... 303/91, 97, 103, 105, 303/106, 110, 20

[56] References Cited

U.S. PATENT DOCUMENTS

| 3,578,819 | 5/1971 | Atkins | 303/106 |
| 3,584,921 | 6/1971 | Crawford | 303/110 |
| 3,874,741 | 4/1975 | Schnaibel et al. | 303/106 |
| 3,966,266 | 6/1976 | Atkins | 303/110 |
| 3,980,349 | 9/1976 | Cook | 303/110 |
| 3,993,363 | 11/1976 | Skoyles et al. | 303/110 |
| 4,037,881 | 7/1977 | Fleagle | 303/106 |

Primary Examiner—Reinhard J. Eisenzopf

[57] ABSTRACT

An anti-lock brake control system for vehicles with braked wheels comprising a wheel speed sensor for producing a signal proportional to wheel speed; a first switch having an input connected to the sensor to receive the wheel speed signal and being adapted to respond to the rate of change of said signal so as to produce a first control pulse to effect brake pressure release while a preset first wheel deceleration threshold is exceeded; a second switch that is triggered under the control of the first control pulse and which, when triggered, initiates a second control pulse to effect brake pressure release; and a charge storage device that receives the wheel speed signal so that it accumulates a charge dependent on the dip in wheel speed and discharges in response to wheel speed recovery following said dip in wheel speed, and which is associated with the first and second switches so that it discharges in a predetermined manner after the first control pulse terminates and terminates the second control pulse when the stored charge falls to a predetermined level. Preferably, both switches are deceleration sensing switches that respond to the rate of change of the wheel speed signal, the second switch having a predetermined second wheel deceleration threshold, but said second threshold being reduced or removed by the first control pulse when this is produced by the first switch at the first threshold. Preferably, the charge storage device is a capacitor connected in series in the input connection from the sensor to the second switch.

11 Claims, 6 Drawing Figures

ANTI-LOCK BRAKE CONTROL SYSTEM I

This invention relates to an anti-lock brake control system for vehicles with braked wheels.

Anti-lock brake control systems prevent or minimise wheel lock-up by sensing incipient lock-up and then releasing brake pressure until the wheel recovers in speed and then re-applying the brake pressure and repeating the cycle as often as necessary. It is known to detect incipient wheel lock-up by producing an electrical wheel speed signal and feeding this to a deceleration sensing switch which fires and produces a brake pressure release pulse when the wheel deceleration exceeds a preset threshold and there is an accompanying preset fall in wheel speed. Release of the brake pressure allows the wheel to recover in speed towards a synchronous running condition in which there is no wheel slip, but this recovery is delayed and as a result there is a progressive increase in the departure of the actual wheel speed from the synchronous wheel speed before the wheel stops decelerating and begins to accelerate towards the synchronous condition.

This dip in wheel speed, which is in effect a measure of the wheel slip or skid, is recorded as a corresponding charge on an input capacitor of the deceleration switch and is used to control termination of the brake release pulse, that is, to control the brake re-application point. The stored slip charge decays, both in step with the increase in wheel speed and at a preset constant rate determined by the switch input current, and eventually at a predetermined charge level causes the deceleration switch to reset. Thus, the deeper the dip in the wheel speed, the larger will be the stored slip charge and the longer the brake pressure release pulse for a particular wheel recovery acceleration; and the greater the wheel recovery acceleration, the shorter will be the brake pressure release pulse.

A disadvantage of this proposed system is caused by the characteristic of the deceleration switch, whereby the constant slip charge decay rate can only be equal to or greater than the deceleration threshold or speed gradient at which the switch fires, both being determined by the switch input current. Thus, any decrease in the decay rate in order to extend the brake pressure release pulse so as to accommodate slow wheel recovery, such as met under low $\mu$ condition and light wheel loading, results in a lower deceleration threshold that may be unacceptable because it allows spurious operation due to rough road conditions. Also, a decrease in the decay rate to give a lower deceleration threshold may, on high $\mu$ surfaces, cause insufficient discharge of the input capacitor so that the deceleration switch is not reset and the brakes are therefore rendered inoperative.

The present invention consists in an anti-lock brake control system for vehicles with braked wheels comprising a wheel speed sensor for producing a signal proportional to wheel speed; a first switch having an input connected to the sensor to receive the wheel speed signal and being adapted to respond to the rate of change of said signal so as to produce a first control pulse to effect brake pressure release while a preset first wheel deceleration threshold is exceeded; a second switch that is triggered under the control of the first control pulse and which, when triggered, initiates a second control pulse to effect brake pressure release; and a charge storage device that receives the wheel speed signal so that it accumulates a charge dependent on the dip in wheel speed and discharges in response to wheel speed recovery following said dip in wheel speed, and which is associated with the first and second switches so that it discharges in a predetermined manner after the first control pulse terminates and terminates the second control pulse when the stored charge falls to a predetermined level.

The invention therefore makes use of two switches, each of which produces a separate control pulse to effect brake pressure release, the first switch producing a first control pulse at any desired low first deceleration threshold and controlling production of the second control pulse by the second switch, the length of the second control pulse being determined independently of said first deceleration threshold by the charge on the charge storage device. Further, termination of the second control pulse is controlled by discharge of the charge storage device in said predetermined manner, but this is delayed by the first control pulse so that the second control pulse is correspondingly lengthened. Thus, the requirements of earlier and longer brake pressure release are met by the invention.

Preferably, both switches are deceleration sensing switches that respond to the rate of change of the wheel speed signal, the second switch having a predetermined second wheel deceleration threshold, equal to or greater than said first threshold, but said second threshold being reduced or removed by the first control pulse when this is produced by the first switch at the first threshold so that the second switch is normally triggered before the second threshold is reached. However, the second switch is not completely dependent on the first switch and will be triggered at the second threshold if not at the first threshold.

The second switch may be adapted so that it produces said second control pulse only after a predetermined drop in wheel speed following the second threshold being exceeded or removal of the second threshold by the first control pulse.

The charge storage device is preferably a capacitor connected in series in the input connection from the sensor to the second switch so that the current passing through the capacitor controls production of said second control pulse, the capacitor discharging through a bias circuit under the control of the first control pulse so that the latter minimises discharge when present and allows discharge in said predetermined manner when absent.

The capacitor will discharge through said bias circuit in said predetermined manner at a rate equal to the second threshold. However, it is possible to vary said discharge rate in accordance with the instantaneous wheel acceleration by producing an acceleration dependent potential and applying this to the bias circuit. Brake re-application is then made doubly dependent on the wheel recovery acceleration.

Figure 1B:
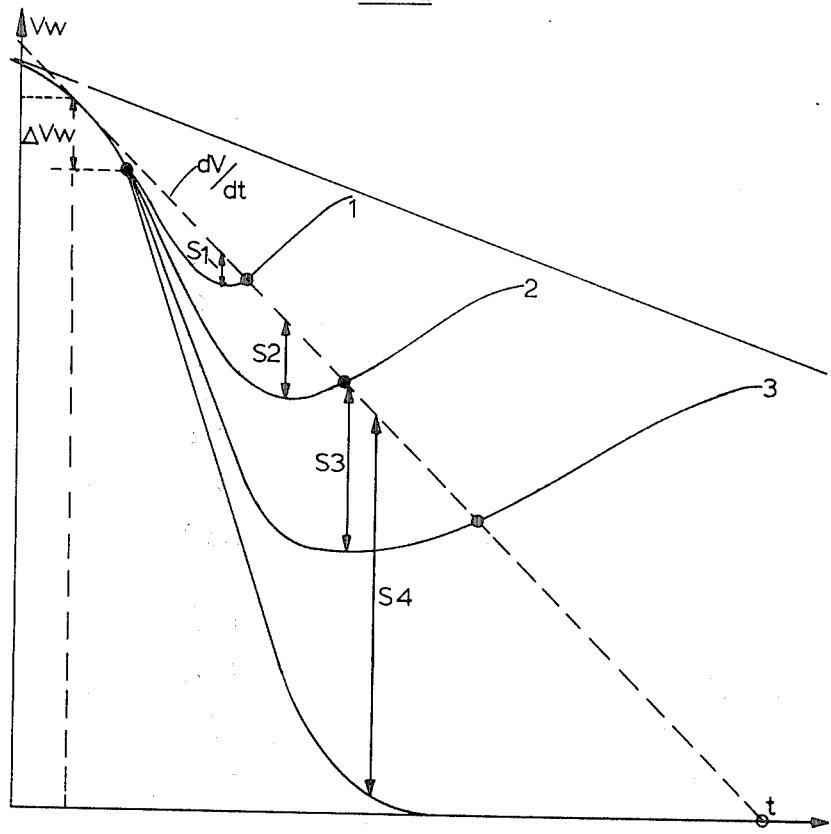

The invention will now be described by way of example with reference to the accompanying drawings in which, FIG. 1a illustrates the deceleration sensing switch of a known anti-lock brake control system and FIG. 1b shows the corresponding wheel speed curve for said system.

Figure 2:
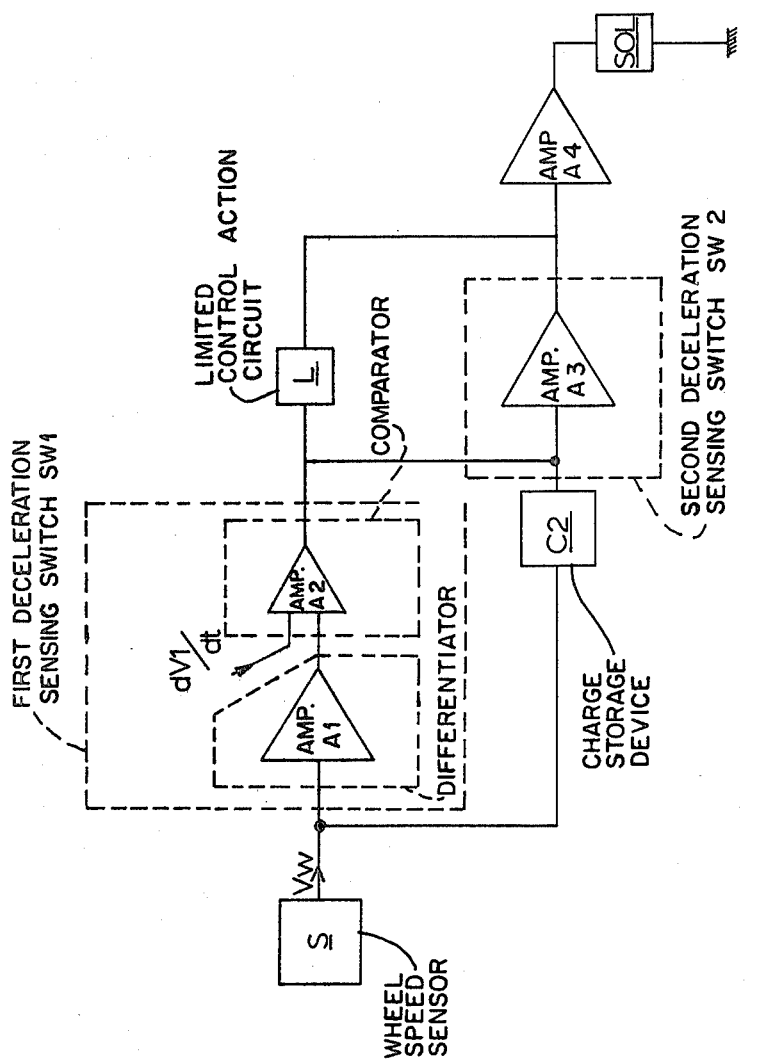
Figure 3:
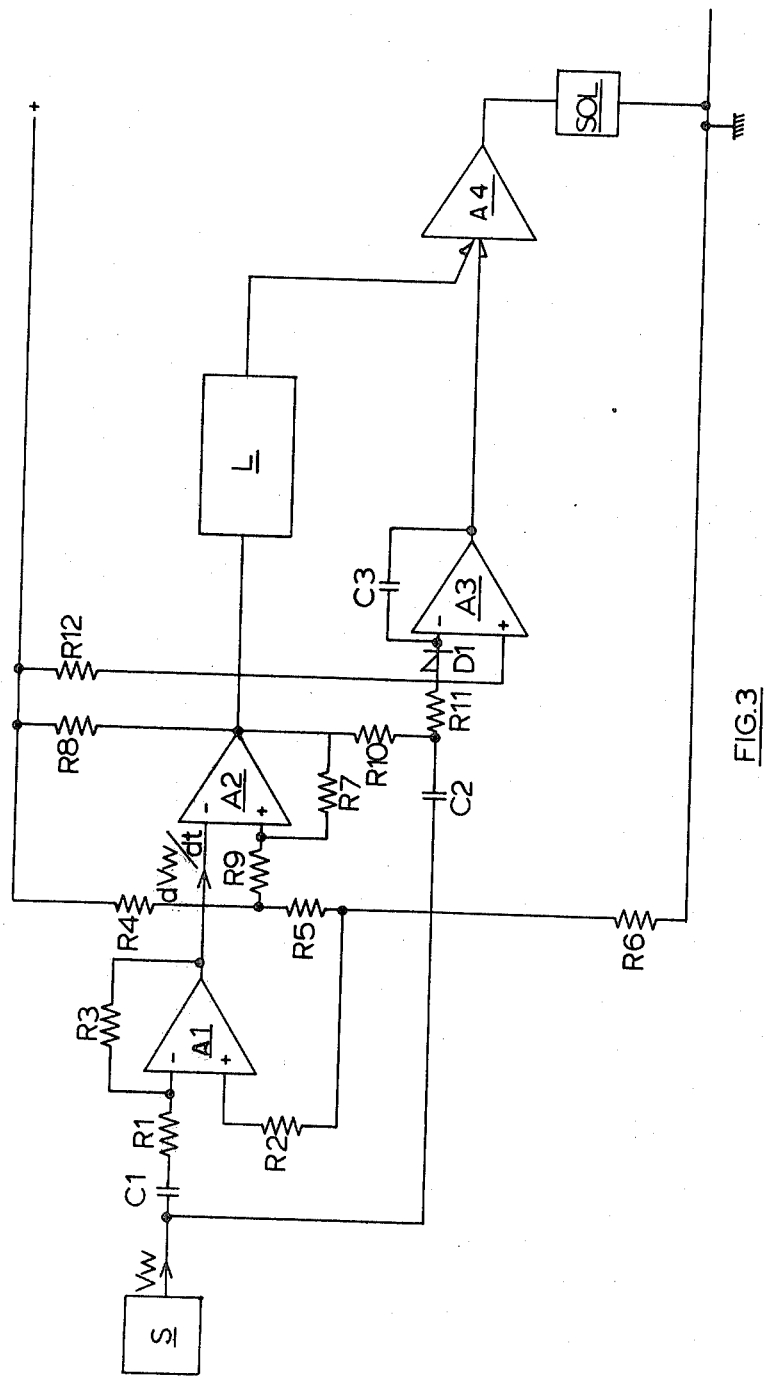
Figure 4:
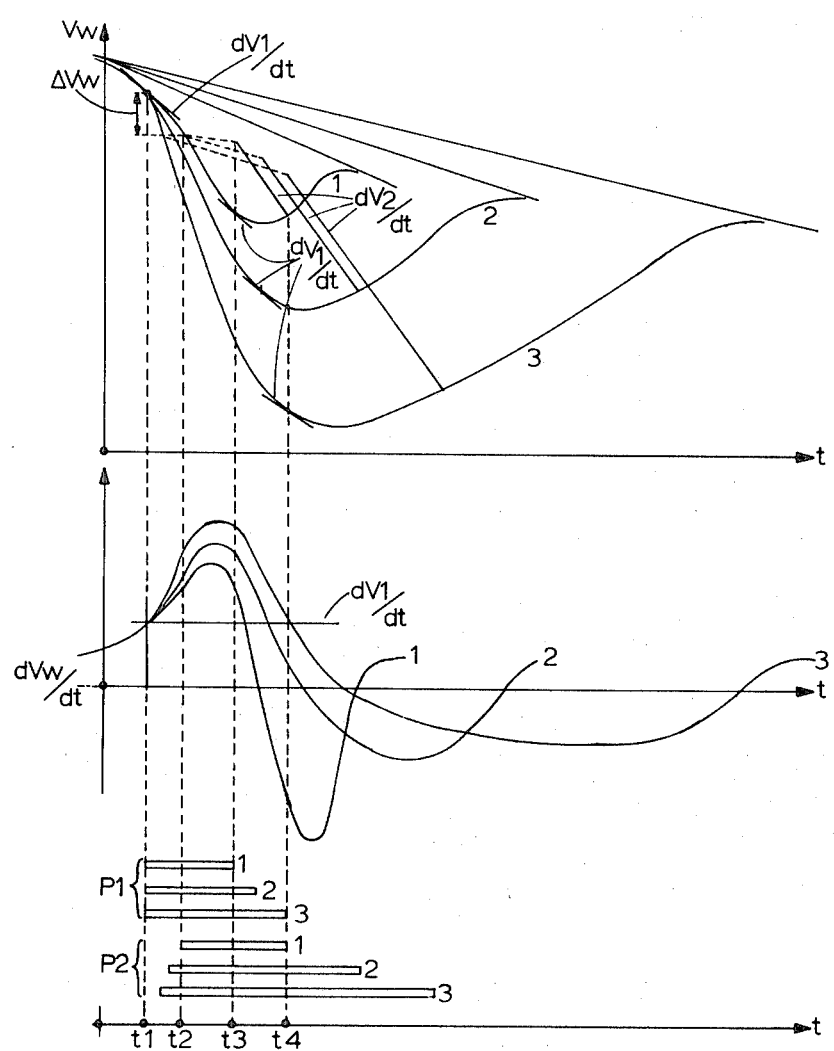
Figure 5:
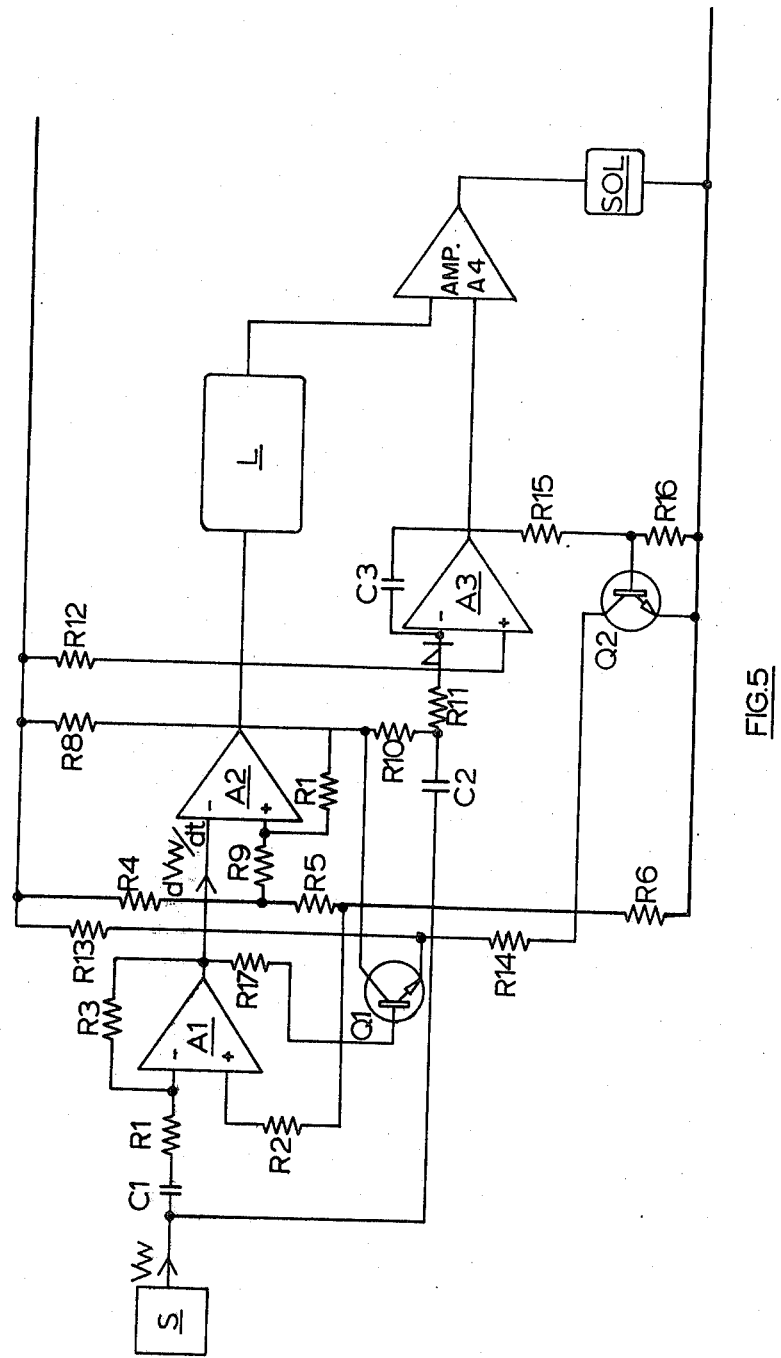

FIG. 2 is a block diagram illustrating an embodiment of an anti-lock brake control system according to the invention, FIG. 3 is a circuit diagram of the embodiment of FIG. 2, FIG. 4 illustrates the wheel speed and deceleration curves associated with the embodiment of FIGS. 2 and 3, and FIG. 5 is a circuit diagram showing a modification to the embodiment of FIG. 3.

The deceleration sensing switch illustrated in FIG. 1a is that used in the known anti-lock brake control system referred to above. The switch is a transistor switch Q with an input capacitor C through which a voltage signal $V_w$ proportional to wheel speed, is fed to the base of the transistor from a wheel speed sensor (not shown). The transistor is biased so as to conduct fully and produce a brake pressure release pulse $V_o$ once a deceleration threshold $dV/dt$ is exceeded and a fall in wheel speed $\Delta V_w$ has occurred. The pulse $V_o$ lasts for a time determined by the charge on capacitor C, which charge changes with wheel speed and decays at a constant leakage rate $dV/dt$ determined by the bias resistor R1. The braking cycle for four different sets of conditions are shown in FIG. 1b; the basic difference in each case being a progressive decrease in the coefficient of friction $\mu$ at the wheel contact surface from curves 1 to 4. Each curve shows the dip in wheel speed S1 to S4 that is recorded as an accumulating charge on capacitor C. This charge decays with increasing wheel speed and at the constant leakage rate $dV/dt$ until the transistor stops conducting, whereupon the brake pressure release pulse $V_o$ terminates, this point being represented by the intersection of the curve with the broken charge leakage line $dV/dt$.

The present invention is based on the appreciation that it is possible to extend the brake pressure release pulse in this known system by providing an additional deceleration switch with a fast response to detect the deceleration threshold for brake pressure release and to produce a control signal while said threshold is exceeded, which control signal reduces the threshold of the original deceleration switch so that the constant rate discharge of the input capacitor is minimised during this period and only becomes effective later in the braking cycle once wheel speed recovery has commenced and wheel deceleration has fallen below the threshold of the additional deceleration switch. The reduction in the threshold of the original deceleration switch also allows this switch to fire as soon as the required fall in wheel speed occurs, the switch then producing a second brake pressure release pulse which is terminated under control of the input capacitor. The input capacitor of the original deceleration switch therefore stores the maximum slip charge while the wheel deceleration exceeds the threshold of the additional deceleration switch, and once the deceleration falls below this level again, the input capacitor discharges at said constant rate until, with time and wheel speed recovery, the switch resets and brake pressure is re-applied.

FIG. 2 illustrates the general arrangement of an anti-lock brake control system according to the invention comprising a wheel speed sensor S that produces a voltage signal $V_w$ proportional to wheel speed, a first deceleration sensing switch SW1 comprising a differentiator and a comparator, and a second deceleration sensing switch SW2, each with an input connection from the sensor S so as to receive the wheel speed signal $V_w$ and with an output connection via an amplifier A4 to a brake pressure release solenoid SOL, and a control connection from the output of the first deceleration sensing switch SW1 to a charge storage device in the form of an input capacitor C2 in the input connection of the second deceleration sensing switch SW2.

Referring to both FIGS. 2 and 3, the first deceleration switch SW1 comprises a fast differentiator including a high gain, rapid response, linear, operational amplifier A1 which receives the wheel speed signal $V_w$ via an input capacitor C1 and produces a corresponding wheel acceleration/deceleration signal $dV_w/dt$ that is fed to a comparator comprising an operational amplifier A2. The amplifier A2 has a reference input set by a potential divider R4,R5,R6 to determine the operating threshold $dV1/dt$ of the deceleration switch SW1.

The second deceleration switch SW2 comprises a slow differentiator including an operational amplifier A3 with an input connection from the wheel speed sensor S via the input capacitor C2 and a resistor R11 and diode D1. The operating threshold $dV2/dt$ of the switch SW2 is set by the potential divider R8,R10, and the resistor R11 and diode D1 make it necessary for a preset fall in wheel speed $\Delta w$ to occur beyond this threshold before the amplifier A3 operates at the switch point set by the reference input from resistor R12. The output from amplifier A2 is also connected to the input of amplifier A3 via the potential divider R8,R10 so as to reduce the threshold of amplifier A3 to zero, as described in the following description of the operation of the system.

Under normal braking conditions, the amplifier A1 produces insufficient output voltage $dV_w/dt$ to exceed the threshold $dV1/dt$ set on amplifier A2 via potential divider R4,R5,R6. The output of amplifier A2 is therefore high and the full supply voltage is applied via R8 and R10 to the amplifier A3.

Under incipient skid conditions, the wheel deceleration and corresponding output voltage $dV_w/dt$ of the amplifier A1 rise, and the amplifier is triggered when the threshold $dV1/dt$ of the comparator is exceeded. The output of the comparator then falls to zero and operates through a limited control action circuit L and amplifier A4 to energise the brake pressure release solenoid SOL.

The zero output of amplifier A2 also switches off the threshold requirement $dV2/dt$ at the input of the amplifier A3, but differentiator A3 is not triggered until after the preset fall in wheel speed $\Delta w$ set by resistor R11 and diode D1. During this fall in wheel speed, the threshold $dV1/dt$ of amplifier A2 must continue to be exceeded in order to prevent the comparator reinstating the threshold on amplifier A3. Once triggered, amplifier A3 produces a positive output signal that operates through the amplifier A4 to energise the brake pressure release solenoid SOL.

Also, once the amplifier A3 is triggered, and all the time that the amplifier A2 produces a zero output, the input capacitor C2 accumulates a charge dependent on the wheel slip that occurs in the braking cycle. However, when wheel speed has recovered to the point where wheel deceleration falls below the threshold $dV1/dt$ of the amplifier A2, the comparator resets and reinstates the threshold $dV2/dt$ on the amplifier A3. The slip charge accumulated on capacitor C2 then commences to decay at a rate equal to the threshold of amplifier A3, and in step with the increase in wheel speed until it causes the amplifier A3 to reset and de-energise the brake pressure release solenoid SOL.

The above described sequence of events is illustrated in FIG. 4 for braking cycles under three different sets of conditions 1,2 and 3, where the basic difference is a decrease in surface μ from curves 1 to 3. Considering curve 1, for example, this shows a progressive fall in wheel speed as a result of applied brake pressure. As wheel deceleration $dV_w/dt$ exceeds the threshold $dV_1/dt$ of amplifier A2 at time t1, the latter is triggered and produces a zero output pulse P1 that releases the applied brake pressure via solenoid SOL. This zero output pulse lasts until time t3 when, with wheel speed recovery following brake release, wheel deceleration falls below threshold $dV_1/dt$. However, before time t3, the amplifier A3 is triggered at time t2 once the wheel speed has dropped by Δw following triggering of amplifier A2 at time t1 and the resultant removal of the input threshold $dV_2/dt$ on amplifier A2. The amplifier A3 thus produces a positive output pulse P2 that continues to release the brake pressure after time t3. This positive output pulse lasts until time t4 when the charge accumulated in capacitor C2 has decayed sufficiently to cause amplifier A3 to reset, the brake then being re-applied. The accumulated charge on capacitor C2 accumulates during the period t1 to t3 while amplifier A2 is triggered and is substantially proportional to the wheel slip during this period, although there is a very slight charge leakage proportional to wheel speed dip represented by the broken curved lines in the speed curves in FIG. 4.

Normally, the slip decay rate has a value similar to the deceleration threshold $dV_2/dt$ of the amplifier A3, and this can be made equal to or greater than the deceleration threshold $dV_1/dt$ of the amplifier A2 depending on the decay characteristic required as dictated by expected wheel inertia.

The limited control action circuit L connected between the amplifier A2 and the solenoid SOL is such as to limit the time for which the solenoid can be energised by any output pulse from A2 and the frequency with which the solenoid can be energised, thereby avoiding any serious fall in brake pressure due to spurious skid signals such as produced under rough road conditions. The circuit may be that described in U.S. patent application Ser. No. 893,799.

An alternative embodiment is shown in FIG. 5, in which the slip charge decay rate $dV_2/dt$ is varied during the braking cycle by varying the threshold of the amplifier A3 in accordance with the instantaneous acceleration level $dVw/dt$ detected by the amplifier A1. The brake re-application point is then doubly dependent on the wheel recovery acceleration.

The control system of FIG. 5 is the same as that of FIG. 3 except for the addition of the transistors Q1 and Q2 and associated bias resistors R13 to R17 that together control the decay rate. Transistor Q2 is turned on when the amplifier A3 produces an output signal, and remains on until the slip decay is complete. Transistor Q1 is the control current modulator which produces a current output at the collector that decreases as the acceleration increases. A decrease in this control current acts through R8 to increase the rate of slip decay $dV_2/dt$. Thus, at high rates of wheel recovery the slip decay is increased and the solenoid pulse ends sooner. Because the output voltage level of the amplifier A1 is high under deceleration conditions, the decay rate is not reduced during the period in which the deceleration is falling, as the collector base junction of Q1 becomes reverse biassed and the voltage drop across R8 is limited to the differentiator output signal level until a certain minimum acceleration occurs. This prevents the slip storage being maintained at the full value during a medium to high μ stop where high levels of vehicle deceleration might produce a braking cycle in which there is very little recovery acceleration and which otherwise would produce a permanent solenoid output drive during the stop owing to slip being maintained by the vehicle deceleration.

The illustrated anti-lock brake control systems according to the invention have the following advantages:
1. Rapid skid detection made possible by the fast response of the first deceleration switch.
2. Limited control action directly by the first deceleration switch since a back-up channel, formed from the second deceleration switch, is present to ensure further control action should the limited attempt be inadequate under some conditions.
3. Under conditions of noise, the first deceleration switch is capable of producing only limited frequencies of solenoid signalling, irrespective of the severity of frequency of noise input, since the second deceleration switch, provided as a back-up means, has a deliberately slowed down response to reduce its sensitivity to noise signals.
4. Under conditions of total ineffectiveness of the fast but limited control action of the first deceleration switch, the second deceleration switch produces a response which tends to merge with that of the first switch. Thus the first switch, whilst ineffective in isolation, does provide an advance of the more complete control action.
5. The second deceleration switch is capable of maximum storage of wheel slip levels during the period in which the excess deceleration is seen to exist as detected by the first deceleration switch. The subsequent decay of stored slip levels can be set to a value greater than that equivalent to the original detection threshold or can be adapted to a level dependent on the recovery deceleration. In this way the danger of establishing more slip than can be removed by wheel recovery will be obviated since slip decay will be low only during the excess deceleration period.

We claim:
1. An anti-lock brake control system for vehicles with braked wheels comprising a wheel speed sensor for producing a signal proportional to wheel speed; a first switch having an input connected to the sensor to receive the wheel speed signal and being adapted to respond to the rate of change of said signal so as to produce a first control pulse to effect brake pressure release while a preset first wheel deceleration threshold is exceeded; a second switch that is triggered under the control of the first control pulse and which, when triggered initiates a second control pulse to effect brake pressure release; and a charge storage device that receives the wheel speed signal so that it accumulates a charge dependent on the dip in wheel speed and discharges in response to wheel speed recovery following said dip in wheel speed, and which is associated with the first and second switches so that it discharges in a predetermined manner after the first control pulse terminates and terminates the second control pulse when the stored charge falls to a predetermined level.

2. A control system as claimed in claim 1 in which the second switch has an input connected to the sensor to receive the wheel speed signal and is adapted to respond to the rate of change of said wheel speed signal so as to initiate a second control pulse when wheel deceleration exceeds a preset second wheel deceleration threshold, equal to or greater than said first wheel deceleration threshold, a bias circuit being connected to the second switch to determine said second threshold, and the output of the first switch being connected to the bias circuit so as to form a control connection whereby the first control pulse reduces said second threshold condition so as to allow the second switch to be triggered before said second wheel deceleration threshold is reached.

3. A control system as claimed in claim 2 in which the second switch is adapted so that it initiates said second control pulse only after a predetermined drop in wheel speed following said second threshold being exceeded or removal of the second threshold.

4. A control system as claimed in claim 2 in which the charge storage device is a capacitor connected in series in the input connection from the sensor to the second switch so that the current passing through the capacitor controls production of said second control pulse, the capacitor discharging through said bias circuit under the control of the first control pulse so that the latter minimises discharge when present and allows discharge in said predetermined manner when absent.

5. A system as claimed in claim 4 in which the charge storage device discharges in said predetermined manner at a rate substantially equal to the second wheel deceleration threshold.

6. A system as claimed in claim 2 in which the first switch includes a differentiator that responds to the wheel speed signal and produces a corresponding acceleration/deceleration signal that controls the rate of discharge of the charge storage device, the discharge rate being increased in accordance with increasing wheel acceleration, and in which the acceleration signal from the differentiator controls a variable bias potential that is applied to said bias circuit.

7. A system as claimed in claim 6 in which the variable bias potential is produced by a circuit comprising a switch that is triggered to produce the bias potential while the second control pulse exists, and a current modulator device that is connected in series with said switch to the bias circuit and varies the bias potential under the control of the acceleration signal from the differentiator.

8. A system as claimed in claim 1 in which the charge storage device discharges in said predetermined manner at a rate that varies in accordance with the instantaneous wheel acceleration.

9. A system as claimed in claim 8 in which the first switch includes a differentiator that responds to the wheel speed signal and produces a corresponding acceleration/deceleration signal that controls the rate of discharge of the charge storage device, the discharge rate being increased in accordance with increasing wheel acceleration.

10. A system as claimed in claim 1 in which the first switch comprises a differentiator that responds rapidly to changes in the wheel speed signal and produces a corresponding acceleration/deceleration signal, and a comparator that compares the acceleration/deceleration signal with said first preset deceleration threshold and produces the first control pulse while said threshold is exceeded.

11. A system as claimed in claim 1 in which the first control pulse effects brake pressure release via a control circuit that limits the time for which and the frequency with which brake pressure can be reduced.

* * * * *